(12) United States Patent
Okamoto

(10) Patent No.: US 7,404,377 B2
(45) Date of Patent: Jul. 29, 2008

(54) METHOD OF REARING, CULTIVATING OR STOCKING CRUSTACEA AND CRUSTACEA REARED, CULTIVATED OR STOCKED BY THE METHOD

(75) Inventor: Kazutoshi Okamoto, Yaizu (JP)

(73) Assignee: Shizuoka Prefecture, Shizuoka-shi, Shizuoka-ken (JP)

( * ) Notice: Subject to any disclaimer, the term of this patent is extended or adjusted under 35 U.S.C. 154(b) by 33 days.

(21) Appl. No.: 11/352,980

(22) Filed: Feb. 13, 2006

(65) Prior Publication Data

US 2007/0204799 A1 Sep. 6, 2007

(30) Foreign Application Priority Data

Aug. 4, 2005 (JP) ............................. 2005-226353

(51) Int. Cl.
*A01K 61/00* (2006.01)
(52) U.S. Cl. ...................................................... 119/204
(58) Field of Classification Search ................. 119/204, 119/207, 209, 211, 214
See application file for complete search history.

(56) References Cited

U.S. PATENT DOCUMENTS

| | | | | | |
|---|---|---|---|---|---|
| 3,687,111 | A | * | 8/1972 | Epper | 119/201 |
| 3,727,579 | A | * | 4/1973 | Lee | 119/201 |
| 3,916,832 | A | * | 11/1975 | Sweeney | 119/212 |
| 4,055,145 | A | * | 10/1977 | Mager et al. | 119/212 |
| 4,357,902 | A | * | 11/1982 | Sheldon et al. | 119/202 |
| 2005/0145189 | A1 | * | 7/2005 | Matthews et al. | 119/236 |

FOREIGN PATENT DOCUMENTS

JP 2004-135562 5/2004

* cited by examiner

*Primary Examiner*—Son T. Nguyen
(74) *Attorney, Agent, or Firm*—Egbert Law Offices

(57) ABSTRACT

A method of rearing, cultivating or stocking crustacea, and crustacea reared, cultivated or stocked by the method. The method improves the survival rate and survival period of the crustacea. In the method, the crustacea are reared, cultivated or stocked within a deep sea water drawn from the sea at a depth of above 100 meters. The crustacea may be deep sea crustacea living in the sea at a depth of above 100 meters. The crustacea do not include crustacea living in the Sea of Japan at a depth of above 250 meters. The deep sea water may have a temperature of below 20° C.

3 Claims, No Drawings

METHOD OF REARING, CULTIVATING OR STOCKING CRUSTACEA AND CRUSTACEA REARED, CULTIVATED OR STOCKED BY THE METHOD

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a method of rearing, cultivating or stocking (preserving) crustacea and crustacea reared, cultivated or stocked (preserved) by the method. By using a deep sea water or a deep ocean water, the present invention improves the survival rate and the survival period of crustacea which are difficult to rear, cultivate or stock and have a very low survival rate.

BACKGROUND OF THE INVENTION

Recently, owing to population growth, it is often warned that food production in the world is likely to become an urgent subject needing to be solved in the near future, and importance is attached to albuminous fisheries products. Since fishing resources have a tendency to decrease, hope is pinned on the production of animal protein by aquaculture. Many kinds of living things have become extinct or are on the brink of extinction, and biodiversity is being lost. Aquatic animals are resources having a bright future. Various genetic resources are desired to be protected and utilized.

Also desired are various stocking methods which, with the increase of export and import of seafood, make it possible to use fishes as refrigerated fishes, live fishes or fresh fishes, as well as arts of exhibiting or breeding aquatic animals at aquariums and other facilities.

Crustacea are important aquatic animals as products or food for supporting production. There are a great many kinds of crustacea. Crustacea are hopeful genetic resources. Arthropods are the largest group of animals and occupy more than ¾ of all the kinds of animals on earth. It is said that there are about 30,000 kinds of crustacea which are arthropods living in water. Typical crustacea include crabs (*Brachyura*), hermit crabs (*Anomura*), and shrimps and lobsters (*Natantia, Reptantia*) which are called *Decapoda*. In coastal areas, there is a fear of crustacea resources being decreased. Stocking artificially cultured juveniles is thought to be a promising method for the recovery of the resources. These *Decapoda* are very popular foodstuffs. Recently, an increasing number of *Decapoda* are used as fresh or live foodstuffs, not refrigerated. *Macrocheira kaempferi*, which is the largest crab in the world, is popular at aquariums and other facilities. Therefore, the arts of rearing, cultivating or stocking crustacea are very important.

Marine crustacea have been reared, cultivated or stocked in surface sea water.

Japanese Patent Laid-Open Publication No. 2004-135562 discloses an art of cultivating ear shells, sea urchins or turban shells by means of a deep sea water. There are no patent publications which disclose an art of rearing, cultivating or stocking crustacea.

An art of rearing, cultivating or stocking marine crustacea by means of a surface sea water has the following disadvantages.

If marine crustacea such as Japanese lobsters (*Metanephrops japonicus*), sergestid shrimps (*Sergia lucens*), giant spider crabs (*Macrocheira kaempferi*) and deep sea red crabs (*Chaceon granulatus*) are reared, cultivated or stocked in the surface sea water, then there are disadvantages that it is difficult to rear, cultivate or stock the crustacea, the survival rate thereof is very low and the survival period thereof is short.

There are a large number of microorganisms such as viruses and bacteria within the surface sea water. If crustacea such as penaeid shrimps are reared, cultivated or stocked in the surface sea water, then there is a serious disadvantage that a large quantity of crustacea die owing to the infection of the microorganisms.

To avoid the infection, medicines or other foreign matters are added to the surface sea water. Said medicines or other foreign matters may affect the safety of the crustacea as foodstuffs.

If crustacea living in a cool water are to be reared, cultivated or stocked within the surface sea water, it is necessary to cool the water by means of a cooling device. The cooling device does not have a capacity large enough to keep supplying cooled fresh water to a container of the crustacea. The container usually has a water supply system of a circulating type or of a semi-circulating type. If such a water supply system is used, the surface sea water within the container may be contaminated by the accumulation of harmful matters and the increase of bacteria. These are disadvantages inevitable to rearing, cultivating or stocking crustacea by means of the surface sea water.

BRIEF SUMMARY OF THE INVENTION

It is an object of the invention to obviate the above-mentioned disadvantages of the prior art of rearing, cultivating or stocking crustacea by means of the surface sea water.

It is another object of the invention to provide a method of rearing, cultivating or stocking crustacea, said method improving the survival rate and survival period of the crustacea.

It is a further object of the invention to provide crustacea reared, cultivated or stocked by said method.

These and other objects have been achieved by the following.

The present invention is a method of rearing, cultivating or stocking crustacea or crustaceans within a deep sea water drawn from the sea at a depth of beyond 100 meters.

Said crustacea may be deep sea crustacea living in the sea at a depth of beyond 100 meters.

Said crustacea may not include crustacea living in the Sea of Japan at a depth of beyond 250 meters.

Said deep sea water may have a temperature of below 20° C.

Further, the present invention is crustacea reared, cultivated or stocked by said method.

A deep sea water drawn from the sea at a depth of beyond 100 meters has the following characteristics as compared with a surface sea water.

(a) The deep sea water contains few pathogenic organisms or polluted organisms.

(b) The deep sea water has a low temperature throughout the year.

(c) The deep sea water shows slight changes in the properties thereof. The deep sea water is physically, chemically and microbiologically stable.

(d) The deep sea water contains rich inorganic nutrient salts such as nitrate, phosphate and silicate.

For example, in case of a deep sea water of Suruga Bay at a depth of 350 to 700 meters, the number of bacteria is about $\frac{1}{100}$ of that of a surface sea water, the temperature being about 5 to 10° C., the concentration of inorganic nutrient salts being about 3 to 70 times as large as that of a surface sea water.

The present invention which uses the deep sea water having the above-mentioned characteristics has excellent advantages as follows.

(1) It is possible to improve the survival rate and survival period of the crustacea by rearing, cultivating or stocking the crustacea within a deep sea water.

(2) It is possible to rear, cultivate or stock crustacea within a deep sea water without adding medicines or other foreign matters to the deep sea water.

(3) Therefore, the crustacea reared, cultivated or stocked by the method according to the present invention are safe as foodstuffs.

(4) It is possible to effectively produce artificially cultured juveniles with a view to recovering or increasing coastal crustacea resources which are decreasing.

(5) It is possible to exhibit the crustacea reared within a deep sea water.

DETAILED DESCRIPTION OF THE INVENTION

In the present invention, a deep sea water drawn from the sea at a depth of beyond 100 meters is continuously run through a container, circulated so as to move out of and back to said container, or kept within said container to rear, cultivate or stock crustacea within said container.

Containers used in the present invention may have any capacity, and include a small beaker having a capacity of 0.5 liter and a large tank of above 200 tons.

Crustacea living in the oceans in the world, including the Pacific Ocean, the Indian Ocean and the Atlantic Ocean, are contained in containers and reared, cultivated or stocked therein under artificial controls including temperature control, removing excrement and feeding.

Crustacea in the present invention are preferably deep sea crustacea living in the sea at a depth of beyond 100 meters because the deep sea crustacea live in a deep sea water.

Crustacea in the present invention preferably do not include crustacea living in the Sea of Japan at a depth of beyond 250 meters because of the following.

It is well-known that the sea near Japan is influenced by a warm current called "Kuroshio Current" or "Black Current" and a cold current called "Oyashio Current". The deep sea water is formed off the coast of Greenland, moves southward through the Atlantic Ocean, joins a deep sea water formed in the Weddell Sea in the Antarctic, and moves deep in the Indian Ocean and the Pacific Ocean. Thus, the deep sea water circulates on a global scale.

A deep portion of the Sea of Japan at a depth of beyond 250 meters forms a so-called Japan Sea proper water because the deep sea waters and bottom sea waters of the Pacific Ocean do not enter said deep portion. While the Sea of Okhotsk and the Bering Sea are connected to the Pacific Ocean through deep channels, said deep portion of the Sea of Japan forms an ocean basin completely independent of the Pacific Ocean, which is a very unique ocean basin in the world. Therefore, a deep-sea animal community in the Sea of Japan has characteristics different from deep-sea animal communities in the Pacific Ocean, etc.

The deep sea water for rearing, cultivating or stocking crustacea preferably has a temperature of below 20° C. to restrict the propagation of bacteria.

The temperature of the deep sea water within the container is stabilized by making constant the temperature of the deep sea water which is continuously run through said container or circulated so as to move out of and back to said container, or by disposing said container within a large container filled with a water having approximately the same temperature as said deep sea water for rearing, cultivating or stocking crustacea.

The properties and temperature of the deep sea water within the container are stabilized by continuously running a deep sea water through said container or circulating the deep sea water so as to move out of and back to said container and draining the deep sea water or by replacing the deep sea water within said container with a deep sea water preserved in advance. The temperature of the deep sea water is adjusted according to the kind or the stage of growth of the crustacea to be reared, cultivated or stocked.

Excrement is removed from the container with the drainage or exchange of the water or by an artificial means.

Feed is selected according to the kind or the stage of growth of the crustacea to be reared, cultivated or stocked. For example, feed may be selected from phytoplanktons such as *Nannochloropsis* spp. and *Tetraselmis* spp.; diatom species such as *Chaetoceros* spp.; zooplanktons such as rotifer and *Artemia* spp.; and mysids, krills, shrimps, clams, mussels, squids, fishes, dry (commercial) pellets, etc.

Crustacea in the present invention may be any crustacea in the world which are reared, cultivated or stocked. For example, crustacea in the present invention may be any of the following edible crustacean genera: *Macrocheira, Chaceon, Erimacrus, Telmessus, Ranina, Charybdis, Plagusia, Portunus, Scylla, Callinectes, Cancer, Maja, Pseudocarcinus, Chionoecetes, Hyas, Paralithodes, Lithodes, Paralomis, Metanephrops, Nephrops, Marsupenaeus, Penaeus, Fenneropenaeus, Metapenaeus, Metapenaeopsis, Aristeomorpha, Haliporoides, Plesionika, Pandalus, Pandalopsis, Panulirus, Palinurus, Jasus, Thenus, Ibacus, Scyllarides, Homarus, Sergia* and *Pasiphaea*. In addition to the above-mentioned edible crustacea, the crustacea in the present invention may be any of the following crustacean genera for display: *Stenopus, Enoplometopus, Lysmata, Rhynchocinetes* and *Acanthephyra*.

Crustacea in the present invention may be at any of the following stages of growth: egg stage, larval stage, juvenile stage and adult stage.

*Metanephrops japonicus* lives in a sandy bottom at a depth of 200 to 400 meters off the coast of Japan from Kanto area to Kyushu area. The *Metanephrops japonicus* is an expensive edible lobster having a body length of 20 cm. In a normal surface sea water, the *Metanephrops japonicus* has a low survival rate and no eggs thereof have been artificially hatched so far.

*Sergia lucens* is the only planktonic shrimp that is an object of fishery. The *Sergia lucens*, having a life of about 15 months and a body length of about 4 cm, is fished in Suruga Bay, Japan. The rearing period of adults is usually about half a month, the maximum being one month.

*Macrocheira kaempferi* is the largest crab in the world and lives off the coast of Japan from Tohoku area to Kyushu area, mainly in Suruga Bay and Sagami Bay. It is difficult to rear adults for one year. The survival rate of larvae and juveniles has been extremely low.

*Chaceon granulatus*, which lives in Suruga Bay, Japan at a depth of 550 to 850 meters, is a large crab having a carapace width of even 18 cm and a potential commercial fishery resource. In a normal surface sea water, it is difficult to rear adults for one year, no juveniles having been successfully reared.

The inventor made experiments on rearing crustacea. The experiments and results thereof will now be described.

In the experiments, Suruga Bay deep sea waters were used. Said deep sea waters were drawn from a Senoumi ocean basin off Yaizu at two depths of 397 meters and 687 meters. The experiments were made at Suruga-Bay Deep Seawater Aquaculture Research Center of Shizuoka Prefectural Fisheries Experiment Station.

EXPERIMENT 1

[Experiment on Rearing Japanese Lobsters (*Metanephrops japonicus*)]
<Materials and Method>
(1) Rearing Adults 20 ovigerous female Japanese lobsters captured in Suruga Bay were used in the experiment. They had a carapace length of 46.1 to 64.0 mm. Two experimental sections were prepared, one of them being a deep sea water section drawn from a depth of 397 meters, another being a surface sea water section drawn from a depth of 24 meters. In each of said two experimental sections, 10 rearing containers each having a capacity of 20 liters were disposed within a 1.5-ton tank, each of said rearing containers allowing water to pass therethrough. One Japanese lobster was put into each of said rearing containers. 10 Japanese lobsters were reared in said deep sea water section, 9 Japanese lobsters being reared in said surface sea water section.

By exchanging water in each tank at a rate of about 10 times per day, the water temperature in said deep sea water section was adjusted to an average of 14.9° C. (12.1 to 17.0° C.) and the water temperature in said surface sea water section was adjusted to an average of 15.4° C. (12.2 to 17.8° C.). Water was continuously flowing through each of said rearing containers.

The Japanese lobsters were reared for 300 days. They were sufficiently fed every other day with frozen muscles of sergestid shrimps. A residue of the feed and excrements were removed every day. The survival, molting, hatching, etc. of the Japanese lobsters were watched.

(2) Culturing Eggs 60 eggs separated from said ovigerous female Japanese lobsters were used in the experiment. These eggs had a diameter of 2.10 to 2.26 mm. Two experimental sections were prepared, one of them being a deep sea water section drawn from a depth of 687 meters, another being a surface sea water section drawn from a depth of 24 meters. In each of said two experimental sections, 3 beakers each having a capacity of 1 liter were used. 10 eggs were put into each of said beakers. Thus, 30 eggs were reared in each of said two experimental sections.

In each of said two experimental sections, the water temperature was adjusted to an average of 15.3° C. (14.8 to 15.8° C.) by means of a water bath and slight ventilation was maintained. Rearing water was exchanged by moving the eggs every other day to rearing containers prepared in advance.

(3) Rearing Larvae and Juveniles 20 larval Japanese lobsters hatched out of eggs of ovigerous females were used in the experiment. These larval Japanese lobsters had a carapace length of 3.6 to 3.8 mm. Two experimental sections were prepared, one of them being a deep sea water section drawn from a depth of 397 meters, another being a surface sea water section drawn from a depth of 24 meters. In each of said two experimental sections, 10 beakers each having a capacity of 1 liter were used. 1 larva was put into each of said beakers. Thus, 10 larvae were reared in each of said two experimental sections.

In each of said two experimental sections, the water temperature was adjusted to an average of 15.1° C. (14.0 to 15.8° C.) by means of a water bath and slight ventilation was maintained. Rearing water was exchanged by moving the larvae every other day to rearing containers prepared in advance. The larvae were fed with *Artemia* spp. *nauplii* at a ratio of 5/ml and dry pellets. The survival and molting of the larvae were watched almost everyday. After the larvae changed into juveniles, the juveniles were reared in the same way as said larvae until the 150th day after hatch.

<Results>

The deep sea water was effective in the rearing, cultivating and stocking of the Japanese lobsters as apparent from the following results.

(1) Rearing Adults

The survival rates of the Japanese lobsters in the deep sea water section and the surface sea water section were respectively as follows: 90.0% and 77.8% (100 days after the experiment was started); 90.0% and 44.4% (200 days after the experiment was started); 90.0% and 22.2% (300 days after the experiment was started). There were significant differences ($\chi$ statistical test, $p<0.05$) after 214 days between the deep sea water section and the surface sea water section. The survival rates of the Japanese lobsters in the deep sea water section were higher than that in the surface sea water section.

Reared Japanese lobsters molted as follows. 10 Japanese lobsters in the deep sea water section molted and 6 Japanese lobsters in the surface sea water section molted. The average number of times of molting per individual was 1.0 in the deep sea water section and 0.7 in the surface sea water section. The number of times of molting in the deep sea water section was larger than in the surface sea water section.

Larvae were hatched out as follows. The number of individuals hatched out and the ratio of hatching (a value obtained by dividing the number of individuals hatched out by the number of individuals at the beginning of the experiment) were 4 (40%) in the deep sea water section and 2 (22.2%) in the surface sea water section. The ratio of hatching in the deep sea water section was larger than in the surface sea water section.

The survival rate, frequency of molting and ratio of hatching of the Japanese lobsters were improved by rearing them in the deep sea water. The deep sea water had favorable influences upon the survival, growth and hatching of the Japanese lobsters.

(2) Culturing Eggs

In the surface sea water section, all separated eggs died, without being hatched, 30 days after the beginning of the experiment. In the deep sea water section, 5 among 30 larvae were hatched out, the average time required for hatching being 73.2 days. This was the first time that separated eggs in a deep sea water had ever been hatched.

(3) Rearing Larvae and Juveniles 15 to 18 days after the experiment was started, nine (90.0%) larvae changed into 1st juveniles in the deep sea water section, and seven (70.0%) larvae changed into 1st juveniles in the surface sea water section. These juveniles had a carapace length of 4.0 to 4.2 mm.

150 days after the experiment was started, 6th juveniles having a carapace length of 9.2 to 10.1 mm were found. In the deep sea water section, eight (80 %) 2nd to 5th juveniles and seven (70.0%) 6th juveniles were found. In the surface sea water section, six (60%) 2nd to 5th juveniles and five (50.0%) 6th juveniles were found. Thus, the deep sea water section showed a higher survival rate.

The survival rate of the larvae and juveniles was improved by rearing them in the deep sea water. Thus the deep sea water had favorable influences upon the survival and growth of the larval and juvenile Japanese lobsters.

EXPERIMENT 2

[Experiment on Rearing Sergestid Shrimps (*Sergia lucens*)]
<Materials and Method>

19 adult sergestid shrimps captured in Suruga Bay were used in the experiment. They had a carapace length of 10.15 to 11.69 mm. Two experimental sections were prepared, one of them being a deep sea water section drawn from a depth of 687 meters, another being a surface sea water section drawn from a depth of 24 meters. Each of these sergestid shrimps was put into a beaker having a capacity of 1 liter. 9 sergestid shrimps were reared in the deep sea water section. 10 sergestid shrimps were reared in the surface sea water section.

In each of said two experimental sections, the water temperature was adjusted to an average of 15.2° C. (14.2 to 16.2° C.) by means of a water bath and slight ventilation was maintained. Rearing water was exchanged by moving the sergestid shrimps every other day to rearing containers prepared in advance.

The sergestid shrimps were fed with *Artemia* spp. *nauplii* at a ratio of 5/ml. The survival and molting of the sergestid shrimps were watched almost everyday.

<Results>

The deep sea water was effective in the rearing, cultivating and stocking of the sergestid shrimps as apparent from the following results.

The survival rates of the sergestid shrimps in the deep sea water section and the surface sea water section were respectively as follows: 88.9% and 80.0% (10 days after the experiment was started); 44.4% and 0% (17 days after the experiment was started). In both of said two experimental sections, the survival rates of the sergestid shrimps rapidly decreased between the 10th day and the 17th day after the experiment was started. After the period between the 10th day and the 17th day, the survival rate of the sergestid shrimps in the deep sea water section was stable.

The maximum survival period of the sergestid shrimps in the deep sea water section was 185 days, and the maximum survival period of the sergestid shrimps in the surface sea water section was 17 days. The average survival period of the sergestid shrimps in the deep sea water section was 58.8 days, and the average survival period of the sergestid shrimps in the surface sea water section was 13.0 days. The survival period of the sergestid shrimps in the deep sea water section was longer (t statistical test, $p<0.05$).

In past cases, the average survival period of reared adult sergestid shrimps was as short as half a month, the maximum survival period of reared sergestid shrimps being 30 days. By rearing the sergestid shrimps in the deep sea water section, the survival period was remarkably increased. In past cases, the maximum period of artificial rearing from egg to postlarva was 60.5 days. Therefore, said maximum survival period of 185 days was longer than any other rearing case of any stage in the past. The average life of sergestid shrimps is about 15 months. This means that the sergestid shrimps were reared for a period of ⅓ of the average life.

Reared sergestid shrimps molted as follows. 4 sergestid shrimps in the deep sea water section molted. 2 sergestid shrimps in the surface sea water section molted. The number of times of molting in the deep sea water was 31. The number of times of molting in the surface sea water was 2. The total number of times of molting was 33. The maximum number of times of molting per individual in the deep sea water section was 15. The maximum number of times of molting per individual in the surface sea water section was 1. The average number of times of molting per individual in the deep sea water section was 3.4. The average number of times of molting per individual in the surface sea water section was 0.2. Both the survival period and the number of times of molting in the deep sea water section were increased.

By rearing sergestid shrimps in the deep sea water section, the survival rate, the survival period and the number of times of molting of the sergestid shrimps were improved. The deep sea water had favorable influences upon the survival and growth of the sergestid shrimps.

EXPERIMENT 3

[Experiment on Rearing Giant Spider Crabs (*Macrocheira kaempferi*)]
<Materials and Method>

(1) Rearing Larvae 120 1st zoeas hatched out of eggs of ovigerous females were used in the experiment. These 1st zoeas had a carapace length of 1.48 to 1.52 mm. Two experimental sections were prepared, one of them being a deep sea water section drawn from a depth of 687 meters, another being a surface sea water section drawn from a depth of 24 meters. In each of said two experimental sections, 3 beakers each having a capacity of 1 liter were used. 20 1st zoeas were put into each of said beakers. Thus, 60 1st zoeas were reared in each of said two experimental sections.

In each of said two experimental sections, the water temperature was adjusted by means of a water bath to an average of 16.9° C. (16.0 to 17.8° C.) at the zoea stage or 14.5° C. (13.2 to 16.4° C.) at the megalopa stage, and slight ventilation was maintained. Rearing water was exchanged by moving the larvae every other day to rearing containers prepared in advance. The zoeas were fed with *Artemia* spp. *nauplii* at a ratio of 5/ml. The megalopas were further fed with finely chopped muscles of sergestid shrimps. The survival and molting of the zoeas were watched almost everyday.

(2) Rearing Adults 5 giant spider crabs captured in Suruga Bay were used in the experiment. The crabs had a carapace width of 18.5 to 20.5 mm. A deep sea water drawn from a depth of 397 meters was used for rearing the crabs. All the crabs were put into a single tank having a capacity of 5 tons. The rearing water was put into the tank at a turnover rate of 4 times/day so as to maintain the water temperature at an average of 14.7° C. (12.0 to 17.1° C.), the water being always flowing through the tank. The crabs were reared for 370 days after the experiment was started. The crabs were sufficiently fed with frozen cuttlefishes every other day. A residue of the feed and excrements were removed every day. The survival, etc. of the crabs were watched.

<Results>

The deep sea water was effective in the rearing, cultivating and stocking of the giant spider crabs as apparent from the following results.

(1) Rearing Larvae

The giant spider crabs both in the deep sea water section and in the surface sea water section grew into the 2nd zoea stage 8 to 10 days after the experiment was started, and into the megalopa stage 17 to 25 days after the experiment was started. The giant spider crabs only in the deep sea water section grew into 1st juveniles having a carapace width of about 2 mm 58 to 62 days after the experiment was started. The rate of appearance (the number of individuals divided by the number of individuals at the time when the experiment was started) was as follows: In the deep sea water section, 100% at the 2nd zoea stage, 75% at the megalopa stage, and 10% at the 1st juvenile stage. In the surface sea water section, 95% at the 2nd zoea stage, 71.7% at the megalopa stage, and 0% at the 1st juvenile stage. The survival rate until the 1st juvenile stage in the deep sea water section was higher (?2 statistical test, $p<0.05$). The survival rate of the giant spider crabs was improved by rearing the crabs in the deep sea water. The deep sea water had favorable influences upon the survival and growth of the juveniles of the crabs.

(2) Rearing Adults

The survival rates were 80.0% (219 days after the experiment was started), 60.0% (221 days after the experiment was started), and 40.0% (263 days after the experiment was started). No individual died thereafter until the 370th day. In this period, no individual molted because all of the individuals were adult females. While in the surface sea water, over-the-summer culturing was impossible and the whole-year rearing was difficult, the deep sea water had favorable influences upon the survival of the adult giant spider crabs.

EXPERIMENT 4

[Experiment on Rearing Deep Sea Red Crabs (*Chaceon granulatus*)]

<Materials and Method>

(1) Rearing Juveniles 3 juvenile deep sea red crabs, artificially reared, were used in the experiment. The juvenile crabs had a carapace width of 4.6 to 5.0 mm. A deep sea water drawn from a depth of 687 meters was used for rearing the juvenile crabs. Each of the juvenile crabs was put into a beaker having a capacity of 1 liter.

The water temperature was adjusted to an average of 15.0° C. (12.8 to 15.9° C.) by means of a water bath and slight ventilation was maintained. Rearing water was exchanged by moving the juvenile crabs every other day to rearing containers prepared in advance. The juvenile crabs were fed with *Artemia* spp. *nauplii* at a ratio of 5/ml. The juvenile crabs were further fed with finely chopped muscles of sergestid shrimps. The survival and molting of the juvenile crabs were watched almost everyday.

(2) Rearing Adults 3 adult deep sea red crabs, captured in Suruga Bay, were used in the experiment. The adult crabs had a carapace width of 14.4 to 15.0 cm. A deep sea water drawn from a depth of 687 meters was used for rearing the adult crabs. All of the adult crabs were put into a single container having a capacity of 2.5 tons.

The rearing water was put into the tank at a turnover rate of 8 times/day so as to maintain the water temperature at an average of 9.7° C. (7.80 to 13.2° C.), the water being always flowing through the tank. The adult crabs were reared for 370 days after the experiment was started. The adult crabs were sufficiently fed with frozen cuttlefishes every other day. A residue of the feed and excrements were removed every day. The survival, etc. of the adult crabs were watched.

<Results>

The deep sea water was effective in the rearing, cultivating and stocking of the deep sea red crabs as apparent from the following results.

(1) Rearing Juveniles

The survival rates of the juvenile deep sea red crabs were 66.7% (241 days after the experiment was started); 33.3% (306 days after the experiment was started); and 0% (359 days after the experiment was started).

In this period, all of the juvenile crabs molted. The number of times of molting per individual was 3 to 5. The juvenile crabs grew to a carapace width of 12.9 to 19.3 mm. No juvenile deep sea red crabs had been successfully reared so far. The deep sea water had favorable influences upon the survival and growth of the juvenile crabs.

(2) Rearing Adults

The survival rate was 66.7% 170 days after the experiment was started. No individual died thereafter until the 370th day. In this period, no individual molted because all of the individuals were adult females. While in the surface sea water, rearing was difficult, the deep sea water had favorable influences upon the survival of the adult deep sea red crabs.

As many apparently widely different embodiments of the present invention may be made without departing from the spirit and scope thereof, it is to be understood that the invention is not limited to the specific embodiments thereof except as defined in the appended claims.

I claim:

1. A method for rearing, cultivating and stocking crustacea comprising:

drawing in sea water from a body of water from a depth of 350-700 meters below a surface of the sea water, the sea water at the depth of 350-700 meters having a number of bacteria of approximately 1/100 of a number of bacteria at the surface of the sea water, the sea water at a depth of 350-700 meters having a concentration of inorganic nutrient salts of between 3 and 70 times the concentration of inorganic nutrient salts at ths surface of the sea water, the drawn-in sea water having a temperature of approximately 5 to 10° C.;

circulating the drawn-in sea water through a container such that the drawn-in sea water is maintained at a temperature of less than 20° C.;

obtaining the crustacea from the body of water in which the crustacea live at a depth of beyond 100 meters; and submerging the obtained crustacea in the drawn-in sea water in said container.

2. The method of claim 1, the obtained crustacea being from the body of water in which the crustacea live at a depth of less than 250 meters.

3. The method of claim 1, the step of circulating comprising:

continuously circulating the drawn-in sea water into and out of said container.

* * * * *